(12) United States Patent
Kawakami

(10) Patent No.: US 7,286,297 B2
(45) Date of Patent: Oct. 23, 2007

(54) LENS SYSTEM UTILIZING LIGHT-TRANSMITTING CERAMIC AND CAMERA ASSEMBLY USING LENS SYSTEM UTILIZING LIGHT-TRANSMITTING CERAMIC

(75) Inventor: Etsuro Kawakami, Akishima (JP)

(73) Assignee: Casio Computer Co., Ltd., Tokyo (JP)

( * ) Notice: Subject to any disclaimer, the term of this patent is extended or adjusted under 35 U.S.C. 154(b) by 0 days.

(21) Appl. No.: 11/225,800

(22) Filed: Sep. 13, 2005

(65) Prior Publication Data
US 2006/0061880 A1    Mar. 23, 2006

(30) Foreign Application Priority Data
Sep. 17, 2004    (JP)    ............... 2004-270675

(51) Int. Cl.
G02B 3/00    (2006.01)
G02B 9/00    (2006.01)
(52) U.S. Cl. ..................................... 359/642; 359/754
(58) Field of Classification Search ................ 359/754, 359/642
See application file for complete search history.

(56) References Cited

U.S. PATENT DOCUMENTS 6,825,930 B2 * 11/2004 Cronin et al. ............... 356/328

FOREIGN PATENT DOCUMENTS

JP    2003-57542 A    2/2003

OTHER PUBLICATIONS

Related U.S. Appl. No. 11/225,799, filed Sep. 13, 2005; Inventor: Makoto Sato; Title: Lens for Photographing System and Camera Assembly Utilizing the Lens.

* cited by examiner

Primary Examiner—Scott J. Sugarman
(74) Attorney, Agent, or Firm—Frishauf, Holtz, Goodman & Chick, P.C.

(57) ABSTRACT

In a lens system in which a plurality of lenses are combined while the lenses are disposed in such a manner that their optical axes are aligned with each other, at least one ceramic lens is used which is produced using a light-transmitting ceramic as a lens material, and the ceramic lens is disposed in the vicinity of a position where chief rays of light of respective image points on an image plane overlap.

10 Claims, 4 Drawing Sheets

LENS SYSTEM UTILIZING LIGHT-TRANSMITTING CERAMIC AND CAMERA ASSEMBLY USING LENS SYSTEM UTILIZING LIGHT-TRANSMITTING CERAMIC

BACKGROUND OF THE INVENTION

1. Field of the Invention

The present invention relates to a small and high performance group of lenses for an optical system that is suitable for use mainly for small photographic devices such as digital cameras.

2. Description of the Related Art

In recent years, in optical equipment such as digital still cameras and video projectors, small and high performance zoom lenses are used.

In a combination lens such as a zoom lens that is used in such optical equipment, compactness and high resolution are required.

Due to this, the applicant of this patent application has filed a patent application for an invention for specifying combination conditions for a small and high performance zoom lens for digital still cameras which is an inexpensive combination lens with a small number of lenses which makes up a zoom lens (Japanese Unexamined Patent Publication No. 2003-057542).

In addition, in these days, light-transmitting ceramics have been developed. These light-transmitting ceramics have higher refractive indices than those of optical glass, and their hardness and flexural strength exhibit higher values than those of optical glass. This has allowed to produce lenses which are suitable for the tendency of making optical systems small in size and thin in thickness.

As has been described above, since light-transmitting ceramics have the higher refractive indices and greater hardness and flexural strength, when used for lenses, the light-transmitting ceramics become optimal for use in making a optical system in optical equipment smaller in size.

In the light-transmitting ceramics, however, since there exists a difference in light transmission properties in wavelength in visible areas, images look as being tinged with yellow, and since bubbles referred to as voids exist in a crystal grain interface, there is caused a problem that the visibility of images formed by ceramic lenses is reduced compared with that by lenses of optical glass.

SUMMARY OF THE INVENTION

A lens system according to a preferred aspect of the invention includes a plurality of lenses which are combined while their optical axes are aligned with each other and at least one ceramic lens formed by using a light-transmitting ceramic as a lens material, wherein the ceramic lens is disposed in the vicinity of a position where chief rays of image points on an image plane are overlapped.

A camera assembly according to the other preferred aspect of the invention includes a lens system including, in turn, a plurality of lenses which are combined while their optical axes are aligned with each other and at least one ceramic lens formed by using a light-transmitting ceramic as a lens material, wherein the ceramic lens is disposed in the vicinity of a position where chief rays of image points on an image plane are overlapped.

The ceramic lens can provide a lens system for optical equipment that can suppress the drawback of ceramic lenses that the visibility of an image is reduced compared with a lens of optical glass and a camera assembly using the lens system.

DETAILED DESCRIPTION OF THE PREFERRED EMBODIMENT

A lens system according to the invention is a zoom lens made up of a first lens group of two lens elements and a second lens group of four lens elements, optical axes of the lens elements which are combined together being aligned with each other, and a ceramic lens is used as a fifth lens element which is a third thinnest lens element in the second lens group which is to be disposed direct behind an aperture stop S.

Figure 1:
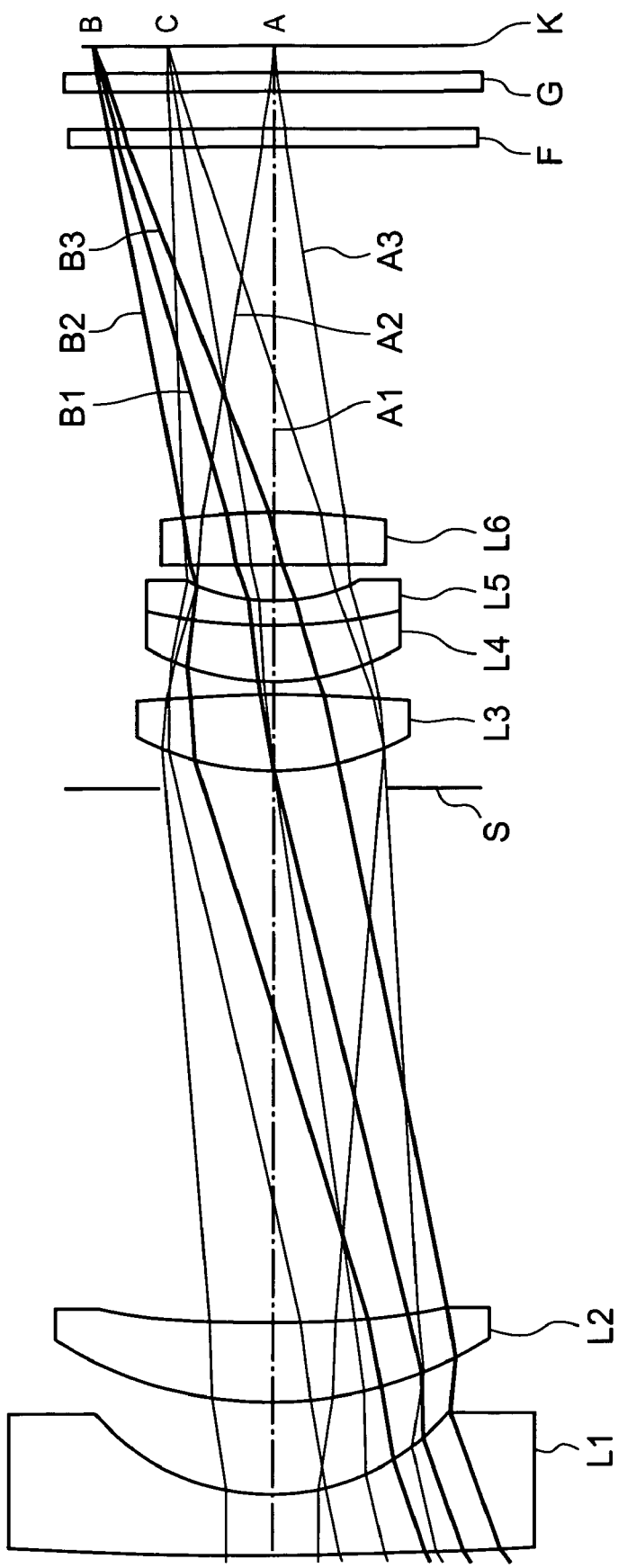
FIG. 1 is an exemplary diagram showing an image forming state by a lens system according to the invention.

Namely, the lens system according to the invention is a lens system as a zoom lens for CCD cameras which uses six lens elements or an optical system as shown in FIG. 1 in which a cover glass G and a filter F such as a low-pass filter are disposed in front of a two-dimensional CCD which constitutes an image forming plane and which has, in front of those cover glass G and the filter F, a first lens element L1 and a second lens element L2, which function as a first lens group, and furthermore, third lens element L3 to sixth lens element L6, which function as a second lens group which is disposed behind an aperture stop S, and a ceramic lens, which is manufactured using a light-transmitting ceramic as a lens material, is used for the fifth lens element L5 which is the third lens element in the second lens group.

Then, in this lens system, the first lens element L1 is made up of a negative meniscus lens which has a convex surface on a front side thereof and the second lens element L2 is made up of a positive meniscus lens which has a convex surface on a front side thereof, so that the first lens group is made to function as a concave lens having a negative refraction force on the whole. In addition, the third lens element L3 is made up of a convex lens having a surface with a small radius of curvature on a front side thereof, the fourth lens element L4 is made up of a positive meniscus lens which has a convex surface on a front side thereof, the fifth lens element L5 is made up of a negative meniscus lens that is to be used in such a state that it is joined to the fourth lens element L4, and the sixth lens element L6 is made up of a convex lens having a surface with a large radius of curvature on a front side thereof, whereby the second lens group is made to function as a convex lens having a positive refraction force on the whole.

Furthermore, in this zoom lens, with respect to dimensions along the direction of optical axis, assuming that the total length of the first lens group and the second lens group is TL, the composite focal length of the total lens system at a wide angle end is fw, and the composite focal length of the second lens group is fII, then, the following results:

$$TL/fw < 1.9 \quad (1)$$

and, $$0.6 < fw/fII < 0.77 \quad (2),$$

and then, satisfying (1) can realize a small zoom lens, and satisfying (2) can attain conditions for high resolution and small aberration.

Then, in the second lens group disposed direct behind the aperture stop S, the coloring effect by ceramics is attempted to be reduced as much as possible by using a ceramic lens for the fifth lens element L5 which can use the thinnest lens thickness in the lens system.

In addition, in the lens system, a ceramic lens is used for one of the lens elements of the second lens group which is a lens group disposed in the vicinity of the aperture stop S where a chief ray corresponding to a central image point A on the optical axis, a chief ray corresponding to a peripheral image point B on the CCD image forming plane and a chief ray corresponding to an intermediate image point C overlap, whereby passing positions on the ceramic lens of a bundle of rays corresponding to the respective image points are made to overlap, so that the degree at which coloring and flare are caused to occur by the ceramic lens does not differ largely on the whole image plane.

Figure 2:
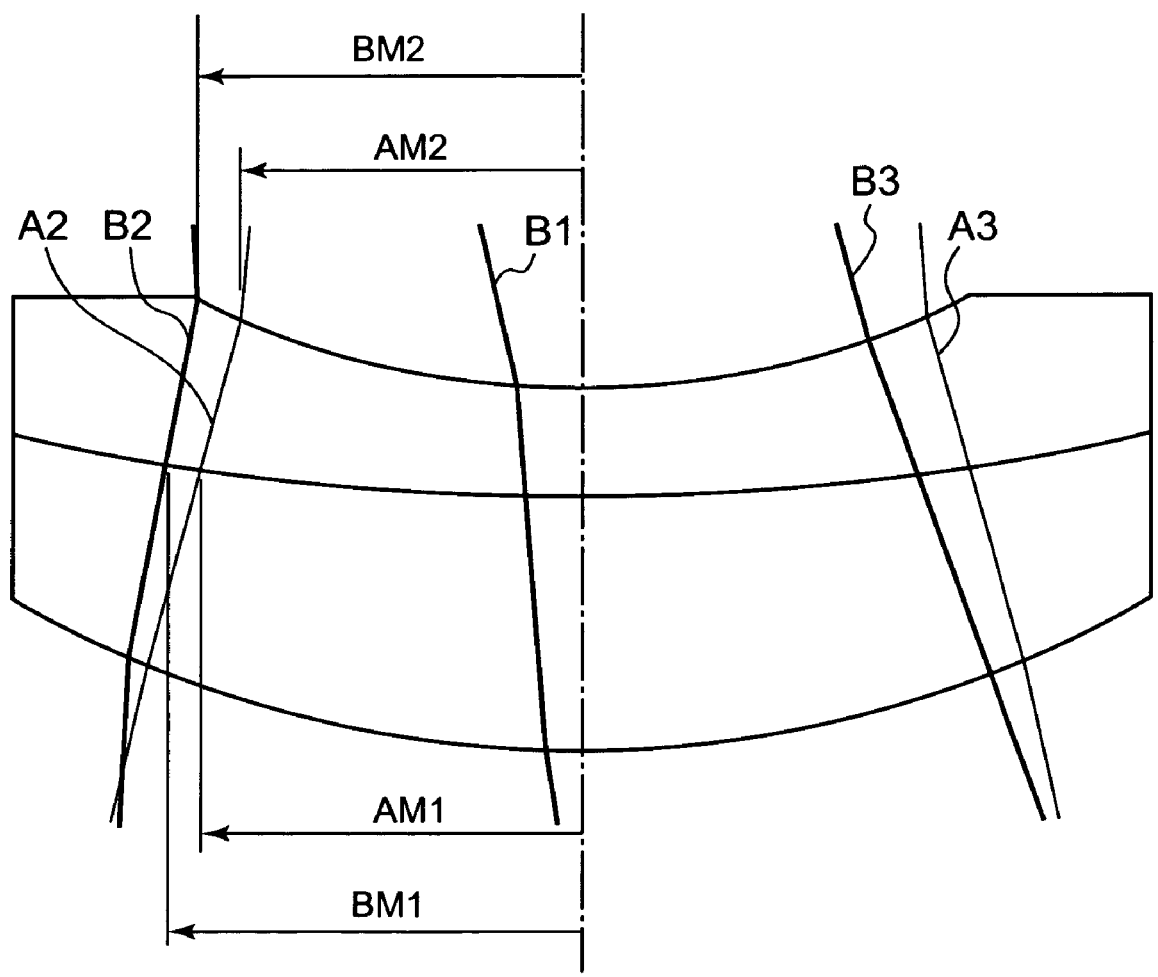
FIG. 2 is an enlarged view of a main portion of the lens system according to the invention.

Furthermore, as is shown in FIG. 2, with curved surface configurations, and refraction indices and Abbe numbers selected for the other lens elements such as the first lens element L1 and the second lens element L2, assuming that the light ray height at the entrance side of the fifth lens element L5 of an upper marginal ray of light which corresponds to the central image point A which is the image plane on the optical axis is AM1, whereas the light ray height at the entrance side of the fifth lens element L5 of an upper marginal ray of light which corresponds to the peripheral image point B which resides in an upper peripheral part of the image plane and which becomes maximum is BM1, then, the following results:

$$BM1/AM1 < 1.5 \quad (3)$$

and, preferably $$BM1/AM1 < 1.1 \quad (4)$$

and, assuming the light ray height at the exit side of the fifth lens element L5 of the upper marginal ray of light corresponding to the central image point A which is the image plane on the optical axis is AM2, whereas the light ray height at the exit side of the fifth lens element L5 of the upper marginal ray of light corresponding to the peripheral image point B which resides in an upper peripheral part of the image plane is BM2, then, the following results:

$$BM2/AM2 < 1.5 \quad (5)$$

and, preferably $$BM2/AM2 < 1.2 \quad (6)$$

Thus, the distance from the optical axis of the upper marginal ray of light corresponding to the peripheral image point B at the upper part of the image plane and the distance from the optical axis of the upper marginal ray of light corresponding to the central image point A are made to approximate each other both on the entrance side and the exit side, whereby the optical path difference within the fifth lens element L5 of rays of light which form images at respective points on the image plane is reduced, so that the degree at which coloring and flare are caused to occur at the image forming locations on the image plane is made to be approximately even on the whole of the image plane.

Figure 3:
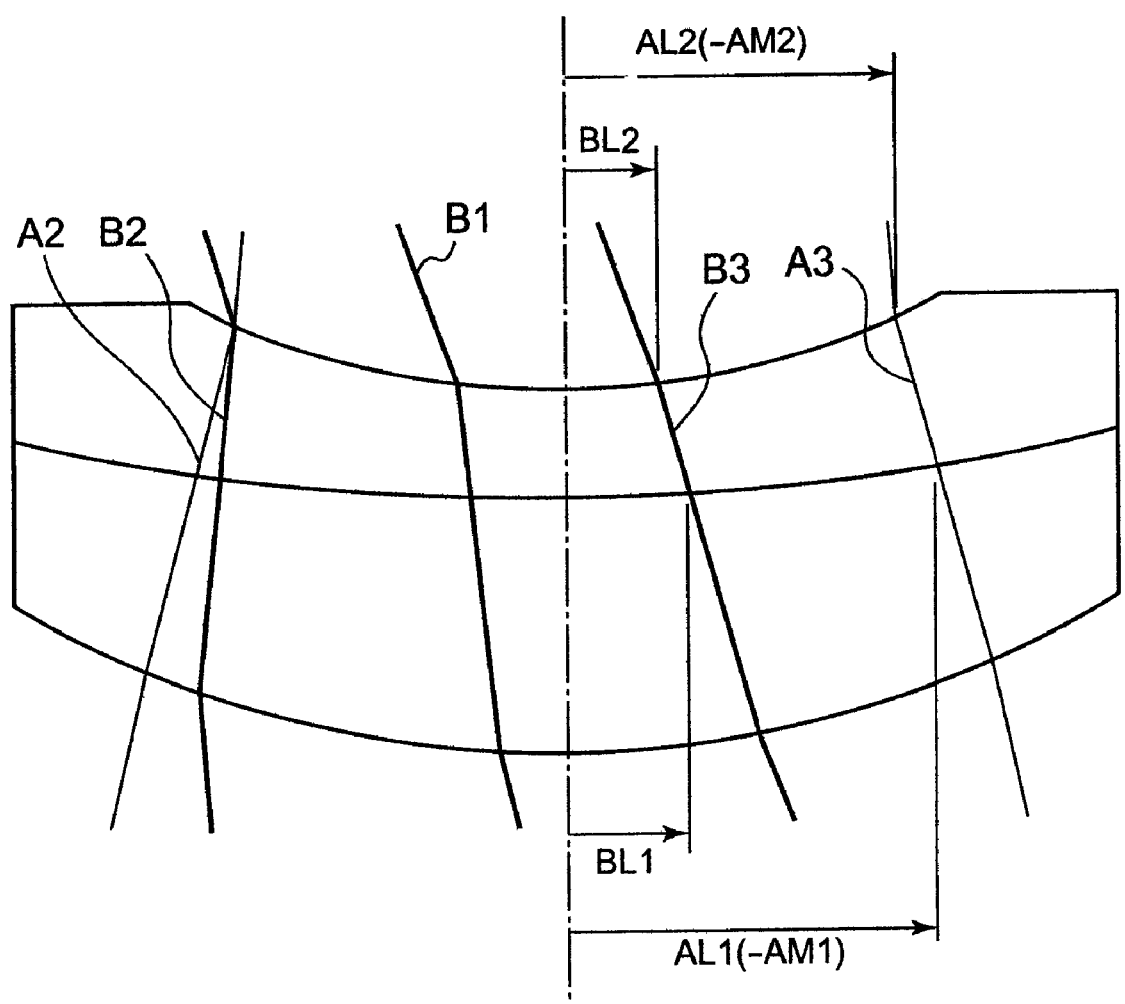
FIG. 3 is an enlarged view of a main portion of the lens system according to the invention.

In addition, in this case, as shown in FIG. 3, assuming that the light ray height at the entrance side of the fifth lens element L5 of a lower marginal ray of light which corresponds to the central image point A which is the image plane on the optical axis is AL1, whereas the light ray height at the entrance side of the fifth lens element L5 of a lower marginal ray of light which corresponds to the peripheral image point B which resides in the upper peripheral part of the image plane and which becomes minimum is BL1, then, the following results:

$$0 < BM1/AM1 \quad (7)$$

and, preferably $$0.30 < BM1/AM1 \quad (8)$$

and, assuming the light ray height at the exit side of the fifth lens element L5 of the lower marginal ray of light corresponding to the central image point A which is the image plane on the optical axis is AL2, whereas the light ray height at the exit side of the fifth lens element L5 of the lower marginal ray of light corresponding to the peripheral image point B which resides in the upper peripheral part of the image plane is BL2, then, the following results:

$$0 < BM2/AM2 \quad (9)$$

and, preferably $$0.28 < BM2/AM2 \quad (10)$$

Thus, the lower marginal ray of light of the peripheral image point B residing at the upper part of the image plane is made to be directed in the same direction as that of the lower marginal ray of light of the central image point with respect to the optical axis, and the bundles of rays of light of the respective image points are made to pass through a position that is common to the bundle of rays of light of the central image point, whereby the optical path difference within the fifth lens element L5 of rays of light which form images at respective points on the image plane is reduced, so that the degree at which coloring and flare are caused to occur at the image forming locations on the image plane is made to be approximately even on the whole of the image plane.

Note that conditions for light ray height of marginal rays of light are made to be those at a wide angle end position of the zoom lens.

Thus, by using the ceramic lens for the fifth lens element L5, the lens system can be obtained in which the effect of the light-transmitting ceramic on coloring and flare is reduced.

Assuming:

fw; composite focal length of the whole lens system at wide angle end,
f1; focal length of the first lens element,
v1; Abbe number for the first lens element,
v2; Abbe number for the second lens element,
n2; refractive index on d line of the second lens element,
R2; radius of curvature on a rear surface of the first lens element, the following results:

$$-1.1 < fw/f1 < -0.8$$

$$10 < v1 - v2$$

$1.66 < n2$ $1.16 < fw/R2 < 1.51$ and, power was appropriately distributed to the first lens group which has the negative refraction force, whereby the enlargement of the whole optical system was prevented and balancing several aberrations was facilitated.

In addition, assuming:

v3; Abbe number for the third lens element,
v4; Abbe number for the fourth lens element,
v5; Abbe number for the fifth lens element,
n3; refractive index on d line of the third lens element,
n4; refractive index on d line of the fourth lens element,
f3; focal length of the third lens element;
R5; radius of curvature on a front surface of the third lens element,
R9; radius of curvature on a rear surface of the fifth lens element, the following results:

$29.7 < (v3+v4)/2 - v5$ $1.45 < (n3+n4)/2 < 1.78$ $0.5 < fw/f3 < 0.85$ $0.8 < fw/R5 < 1.45$ $0.75 < R5/R9 < 1.45$, whereby an optical system was obtained in which there are few aberrations.

Then, specific numerical examples of this zoom lens are shown in Table 1.

In the table, f denotes a focal length of the whole lens system, $F_{NO}$ F numbers, 2ω total angle of view of lens and $b_f$ back-focal distance. The back-focal distance $b_f$ is an air converted distance of a distance from the rear surface of the sixth lens which makes up the second lens group to the image plane. In addition, R denotes radius of curvature, D lens thickness or lens space, $n_d$ refractive index of d line and $v_d$ Abbe number of d line.

TABLE 1 f = 5.00~8.24~13.50
$F_{No}$ = 3.22~4.04~5.39
2ω = 64.3°~40.1°~24.8°
$b_f$ = 7.523~10.049~14.201

| Surface No. | R | D | $n_d$ | $v_d$ | |
|---|---|---|---|---|---|
| 1 | 47.8657 | 1.000 | 1.80025 | 40.8 | First lens element |
| 2 | 3.6748 | 1.557 | | | |
| 3 | 6.6658 | 1.268 | 1.84666 | 23.785 | |
| 4 | 15.1935 | 9.180~3.900~0.725 | | | |
| 5 | 4.0754 | 1.264 | 1.56907 | 71.315 | Second lens element |
| 6 | −34.1334 | 0.212 | | | |
| 7 | 4.1351 | 0.967 | 1.62041 | 60.344 | |
| 8 | 9.9538 | 0.400 | 2.08165 | 30.288 | |
| 9 | 3.1948 | 0.585 | | | |
| 10 | 66.3961 | 0.904 | 1.67407 | 55 | |
| 11 | −11.3711 | 7.523~10.049~14.201 | | | |

Aspheric coefficient

| Surface No. | K | $A_4$ | $A_6$ | $A_8$ | $A_{10}$ |
|---|---|---|---|---|---|
| 2 | −3.4886 | 7.3110E−03 | −4.7308E−04 | 3.2015E−05 | −1.0426E−06 |
| 5 | −1.096 | 0.0000E+00 | 2.5755E−04 | −7.7718E−05 | −1.0822E−07 |
| 6 | −13.769 | −7.7187E−04 | 3.4108E−04 | −1.4188E−04 | 7.4981E−06 |
| 11 | 8.00044 | 2.0569E−03 | 3.8219E−04 | −6.9746E−05 | 2.8466E−05 |

The light ray height ratio of the upper marginal rays of light at the fifth lens element L5 of the lens system which is made as the zoom lens that is configured as has been described heretofore becomes as follows:

$BM1/AM1 < 1.08$ $BM2/AM2 < 1.12$ $BL1/AL2 < 0.331$ $BL2/AL2 < 0.291$ and, there was caused almost no reduction in visibility that would otherwise be caused when ceramic lenses are used, and almost no coloring was caused.

Figure 4A:
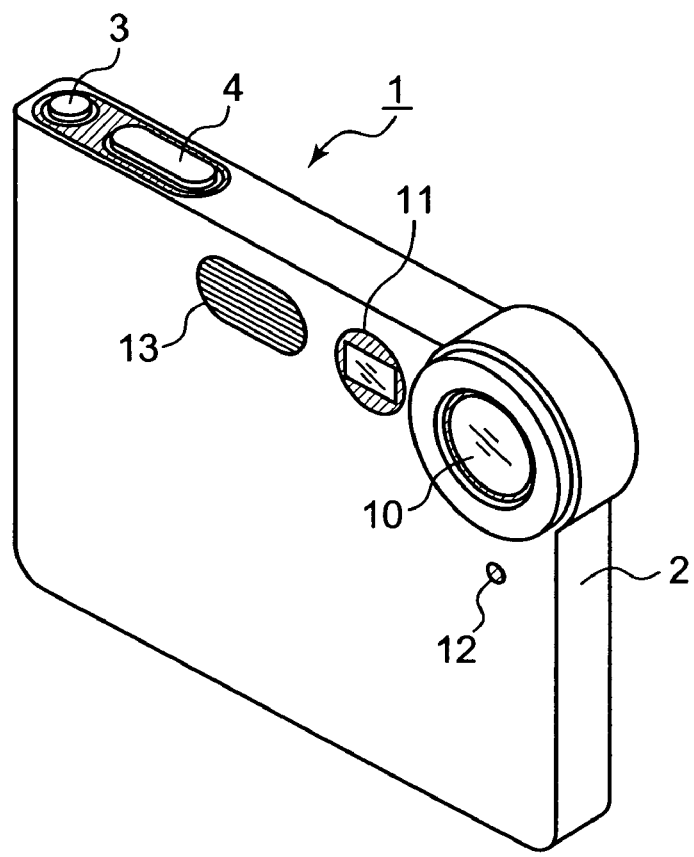
FIG. 4A is a front perspective view of a camera assembly using the lens system according to the invention.
Figure 4B:
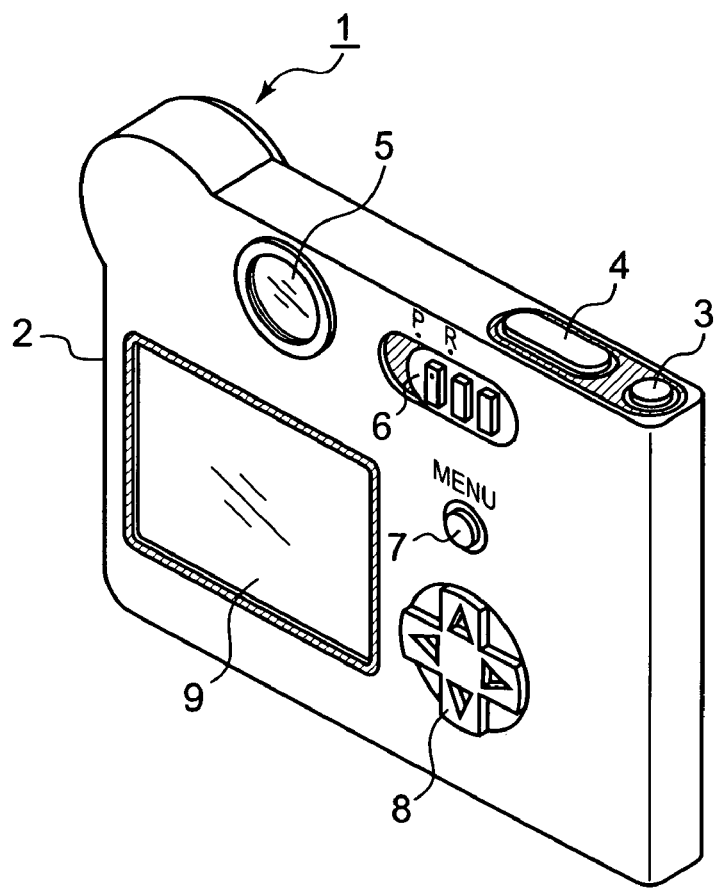
FIG. 4B is a rear perspective view of the camera assembly using the lens system according to the invention.

Incidentally, the lens system according to the embodiment that has been described heretofore can be used in a camera assembly as shown in FIGS. 4A, 4B.

Next, FIGS. 4A and 4B show the external appearance of a digital camera 1 equipped with the lens system of the embodiment that has been described above, in which FIG. 4A is a perspective view as seen from a front upper side, and FIG. 4B is a perspective view as seen from a rear upper side. As shown in the figures, a power supply key 3 and a shutter release key 4 are disposed at rightward positions on an upper side of a camera main body 2 of the digital camera 1 which camera main body is formed into a rectangular parallelepiped, flat plate-like box shape. The power supply key 3 is such as to turn on and off the power supply, and the shutter release key 4 is such as to implement a shutter releasing operation when activated in a recording mode and also functions as a selection/execution key when menu items denoting various operation modes are displayed.

In addition, disposed on the back of the digital camera 1 are an optical view finder eyepiece 5, a record (REC)/playback (PLAY) changeover switch 6, a menu key 7, a cursor key 8 with which displayed menu items are selected and a liquid-crystal monitor 9. The record/playback switch 6 is a switch for changing over modes between a record mode and a playback mode, and the menu key 7 is such as to have menu items of various operation modes displayed. The cursor key 8 is such as to move over the displayed menu items for selection, and the liquid-crystal monitor 9 is made up of, for example, a color liquid-crystal display panel with a back light and displays not only an object image (a through image) when waiting for photographing under the record mode but also a selected state such as an operation mode selected through the operation of the menu key 7.

Furthermore, disposed on the front side of the camera main body 2 are a photographic lens 10, an optical view finder window 11, a self-timer indication lamp 12 and a strobe light emitting portion 13. Then, in the embodiment of the invention, the photographic lens 10 is made up of the lens system including the aforesaid ceramic lens.

According to the invention, the lens system can be made small in size and durable by virtue of the utilization of the ceramic lens, and the reduction in quality of image can be prevented when the lens system according to the invention is used in camera assemblies.

What is claimed is:

1. A lens system comprising:
   a plurality of lenses having aligned optical axes; and
   at least one ceramic lens made of a light-transmitting ceramic material,
   wherein the ceramic lens is shaped to form a refractive interface and has a curved surface, and wherein the ceramic lens is disposed in a vicinity of a position where chief rays of image points on an image plane are overlapped.

2. A lens system as set forth in claim 1,
   wherein the ceramic lens has a first refractive surface and a second refractive surface; and
   wherein if light ray heights at intersection points between a lower marginal ray of light which corresponds to an image point on an optical axis and the first refractive surface and the second refractive surface are AL1 and AL2, respectively, and if light ray heights at intersection points between a lower marginal ray of light which corresponds to a peripheral image point and the first refractive surface and the second refractive surface are BL1 and BL2, respectively, then the lens system results in:

$0 < BL1 < AL1$ and $0 < BL2 < AL2$, wherein:
   AL1 is the light ray height of the lower marginal ray of light which corresponds to the image on the optical axis on the first refractive surface;
   AL2 is the light ray height of the lower marginal ray of light which corresponds to the image on the optical axis on the second refractive surface;
   BL1 is the light ray height at the intersection point with the lower marginal ray of light which corresponds to the peripheral image on the first refractive surface;
   BL2 is the light ray height at the intersection point with the lower marginal ray of light which corresponds to the peripheral image on the second refractive surface; and
   wherein AL1, AL2, BL1 and BL2 have a negative symbol indicating that the light ray is below the optical axis.

3. A lens system as set forth in claim 1,
   wherein the ceramic lens has a first refractive surface and a second refractive surface; and
   wherein if light ray heights at intersection points between an upper marginal ray of light which corresponds to an image point on an optical axis and the first refractive surface and the second refractive surface are AM1 and AM2, respectively, and light ray heights, at intersection points between an upper marginal ray of light which corresponds to a peripheral image point and the first refractive surface and the second refractive surface are BM1 and BM2, respectively, then the lens system results in:

$BM1/AM1 < 1.5$ and $BM2/AM2 < 1.5$, wherein:
   AM1 is the light ray height of the upper marginal ray of light which corresponds to the image on the optical axis on the first refractive surface;
   AM2 is the light ray height of the upper marginal ray of light which corresponds to the image on the optical axis on the second refractive surface;
   BM1 is the light ray height at the intersection point with the upper marginal ray of light which corresponds to the peripheral image on the first refractive surface;
   BM2 is the light ray height at the intersection point with the upper marginal ray of light which corresponds to the peripheral image on the second refractive surface; and
   wherein AM1, AM2, BM1 and BM2 have a positive symbol indicating that the light ray is above the optical axis.

4. A lens system as set forth in claim 3,
   wherein the ceramic lens has a first refractive surface and a second refractive surface; and
   wherein if light ray heights at intersection points between a lower marginal ray of light which corresponds to an image point on an optical axis and the first refractive surface and the second refractive surface are AL1 and AL2, respectively, and if light ray heights at intersection points between a lower marginal ray of light which corresponds to a peripheral image point and the first refractive surface and the second refractive surface are BL1 and BL2, respectively, then the lens system results in:

$0 < BL1 < AL1$ and $0 < BL2 < AL2$, wherein:
   AL1 is the light ray height of the lower marginal ray of light which corresponds to the image on the optical axis on the first refractive surface;
   AL2 is the light ray height of the lower marginal ray of light which corresponds to the image on the optical axis on the second refractive surface;

BL1 is the light ray height at the intersection point with the lower marginal ray of light which corresponds to the peripheral image on the first refractive surface;

BL2 is the light ray height at the intersection point with the lower marginal ray of light which corresponds to the peripheral image on the second refractive surface;

wherein AL1, AL2, BL1 and BL2 have a negative symbol indicating that the light ray is below the optical axis.

5. A camera assembly comprising:

a lens system comprising a plurality of lenses having aligned optical axes, and at least one ceramic lens made of a light-transmitting ceramic material, wherein the ceramic lens is shaped to form a refractive interface and has a curved surface, and wherein the ceramic lens is disposed in a vicinity of a position where chief rays of image points on an image plane are overlapped.

6. A lens system comprising:

a plurality of lenses having aligned optical axes; and at least one ceramic lens which has refractive power and which is made of a light-transmitting ceramic material, wherein the ceramic lens is disposed in a vicinity of a position where chief rays of image points on an image plane are overlapped.

7. A lens system as set forth in claim 6, wherein the ceramic lens has a first refractive surface and a second refractive surface; and wherein if light ray heights at intersection points between a lower marginal ray of light which corresponds to an image point on an optical axis and the first refractive surface and the second refractive surface are AL1 and AL2, respectively, and if light ray heights intersection points between a lower marginal ray of light which corresponds to a peripheral image point and the first refractive surface and the second refractive surface are BL1 and BL2, respectively, then the lens system results in:

$$0 < BL1 < AL1$$

and $$0 < BL2 < AL2,$$

wherein:

AL1 is the light ray height of the lower marginal ray of light which corresponds to the image on the optical axis on the first refractive surface;

AL2 is the light ray height of the lower marginal ray of light which corresponds to the image on the optical axis on the second refractive surface;

BL1 is the light ray height at the intersection point with the lower marginal ray of light which corresponds to the peripheral image on the first refractive surface;

BL2 is the light ray height at the intersection point with the lower marginal ray of light which corresponds to the peripheral image on the second refractive surface; and wherein AL1, AL2, BL1 and BL2 have a negative symbol indicating that the light ray is below the optical axis.

8. A lens system as set forth in claim 6, wherein the ceramic lens has a first refractive surface and a second refractive surface; and wherein if light ray heights at intersection points between an upper marginal ray of light which corresponds to an image point on an optical axis and the first refractive surface and the second refractive surface are AM1 and AM2, respectively, and light ray heights at intersection points between an upper marginal ray of light which corresponds to a peripheral image point and the first refractive surface and the second refractive surface are BM1 and BM2, respectively, then the lens system results in:

$$BM1/AM1 < 1.5$$

and $$BM2/AM2 < 1.5,$$

wherein:

AM1 is the light ray height of the upper marginal ray of light which corresponds to the image on the optical axis on the first refractive surface;

AM2 is the light ray height of the upper marginal ray of light which corresponds to the image on the optical axis on the second refractive surface;

BM1 is the light ray height at the intersection point with the upper marginal ray of light which corresponds to the peripheral image on the first refractive surface;

BM2 is the light ray height at the intersection point with the upper marginal ray of light which corresponds to the peripheral image on the second refractive surface; and wherein AM1, AM2, BM1 and BM2 have a positive symbol indicating that the light ray is above the optical axis.

9. A lens system as set forth in claim 8, wherein the ceramic lens has a first refractive surface and a second refractive surface; and wherein if light ray heights at intersection points between a lower marginal ray of light which corresponds to an image point on an optical axis and the first refractive surface and the second refractive surface are AL1 and AL2, respectively, and if light ray heights at intersection points between a lower marginal ray of light which corresponds to a peripheral image point and the first refractive surface and the second refractive surface are BL1 and BL2, respectively, then the lens system results in:

$$0 < BL1 < AL1$$

and $$0 < BL2 < AL2,$$

wherein:

AL1 is the light ray height of the lower marginal ray of light which corresponds to the image on the optical axis on the first refractive surface;

AL2 is the light ray height of the lower marginal ray of light which corresponds to the image on the optical axis on the second refractive surface;

BL1 is the light ray height at the intersection point with the lower marginal ray of light which corresponds to the peripheral image on the first refractive surface;

BL2 is the light ray height at the intersection point with the lower marginal ray of light which corresponds to the peripheral image on the second refractive surface; and wherein AL1, AL2, BL1 and BL2 have a negative symbol indicating that the light ray is below the optical axis.

10. A camera assembly comprising:

a lens system comprising a plurality of lenses having aligned optical axes, and at least one ceramic lens which has refractive power and which is made of a light-transmitting ceramic material, wherein the ceramic lens is disposed in a vicinity of a position where chief rays of image points on an image plane are overlapped.

* * * * *